(12) United States Patent
Olakangil et al.

(10) Patent No.: US 7,512,122 B1
(45) Date of Patent: Mar. 31, 2009

(54) IDENTIFYING QOS FLOWS USING INDICES

(75) Inventors: Joseph Olakangil, Salt Lake City, UT (US); Gregory Page, Sandy, UT (US); David Morgan, Salt Lake City, UT (US); Steven Clawson, Salt Lake City, UT (US)

(73) Assignee: Alcatel Lucent, Paris (FR)

( * ) Notice: Subject to any disclaimer, the term of this patent is extended or adjusted under 35 U.S.C. 154(b) by 829 days.

(21) Appl. No.: 10/748,487

(22) Filed: Dec. 29, 2003

(51) Int. Cl.
*H04L 12/28* (2006.01)
*G06F 15/173* (2006.01)

(52) U.S. Cl. ............... 370/389; 370/392; 370/395.31; 370/412; 709/238

(58) Field of Classification Search .............. 370/392, 370/428, 429, 389, 411–418, 395.31, 230–356, 370/401; 709/235–238; 379/220.01; 4/270
See application file for complete search history.

(56) References Cited

U.S. PATENT DOCUMENTS

| | | | |
|---|---|---|---|
| 6,567,408 B1 * | 5/2003 | Li et al. ................. | 370/395.31 |
| 6,768,738 B1 * | 7/2004 | Yazaki et al. ............. | 370/392 |
| 7,107,352 B2 * | 9/2006 | Tuck et al. ................. | 709/238 |

* cited by examiner

*Primary Examiner*—Afdar M. Qureshi

(57) ABSTRACT

A multivariant, common basis classification method and apparatus for classifying protocol data units in a network switching device is disclosed. The method of classifying a protocol data unit (PDU) in the preferred embodiment includes the steps of generating a first string and a second string with which to characterize a PDU; mapping first and second strings into a first index and second index, respectively, where the first and second indices are selected from a plurality of indices; and selecting an instruction to apply to the PDU by matching the first and second indices. The plurality of strings are commonly generated from the source and destination address in the packet as well as other indicia with which to identify a traffic flow. The instructions specify how to classify, route, switch, or otherwise process the PDU.

25 Claims, 5 Drawing Sheets

IDENTIFYING QOS FLOWS USING INDICES

FIELD OF INVENTION

The invention generally relates to a technique for classifying packets in a data network. In particular, the invention relates to a method and apparatus for classifying a packet of known traffic flows by matching a plurality of criteria for which there is an associated policy and for classifying new flows using rules derived from the criteria associated with the known traffic flows.

BACKGROUND

In various network devices including switches and routers, packets are inspected in order to identify the type of traffic. Various forwarding decisions and or quality of service policies may then be applied to the packet depending on the type of flow. In many contemporary devices, one or more fields are extracted from the packet and concatenated to form a single search term with which the search is conducted. In many cases, the single term includes one or more bits from the destination address and source address fields of the packet. If there is a complete match between the packet and the criteria representing the policy, the associated policy is applied to the packet. In the absence of a match, a generic default rule may be applied. While the prior art is able to identify and classify a traffic flow that satisfies each criterion, the prior art is generally unable to take advantage of any benefit to be derived from a partial match. There is therefore a need for a method and system for, among other things, classifying a packet by exploiting known properties of the packet even in the absence of a complete match with a policy.

SUMMARY

The preferred embodiment of the present invention features a multivariant, common basis classification method and apparatus for classifying protocol data units in a network switching device. Multivariant classification as used herein employs a plurality of criteria that map to a common set of indices with which the search is conducted. The method of classifying a protocol data unit (PDU) in the preferred embodiment comprises the steps of generating a first string and a second string from the PDU; determining a first index and a second index with the first string and the second string, respectively, from a plurality of indices; and selecting an action, e.g., an instruction to apply to the PDU, based on the first and second indices. While the first and second strings may be generated from any combination of data used by those skilled in the art to process PDUs, the first and second strings in the preferred embodiment comprise addressing information from the PDU. The actions are preferably instructions or pointers to instructions that specify how to classify, route, switch, or otherwise process the PDU. In the preferred embodiment, the actions are generally defined by the network administrator and embody the policies that regulate traffic in the network.

The preferred embodiment of the apparatus for classifying a PDU comprising a string generator for generating the first and second string, and an index allocator for retrieving a first index associated with the first string and a second index associated with the second string. As above, the first index and second index are two of a plurality of indices providing a set of values, i.e., a basis set that spans the policy space. The apparatus may further include a memory device, operatively coupled to the index allocator, including a plurality of actions, where each action is associated with and selected based on two or more indices of the plurality of indices.

BRIEF DESCRIPTION OF THE DRAWINGS

The present invention is illustrated by way of example and not limitation in the figures of the accompanying drawings, and in which.

DETAILED DESCRIPTION

Figure 1:
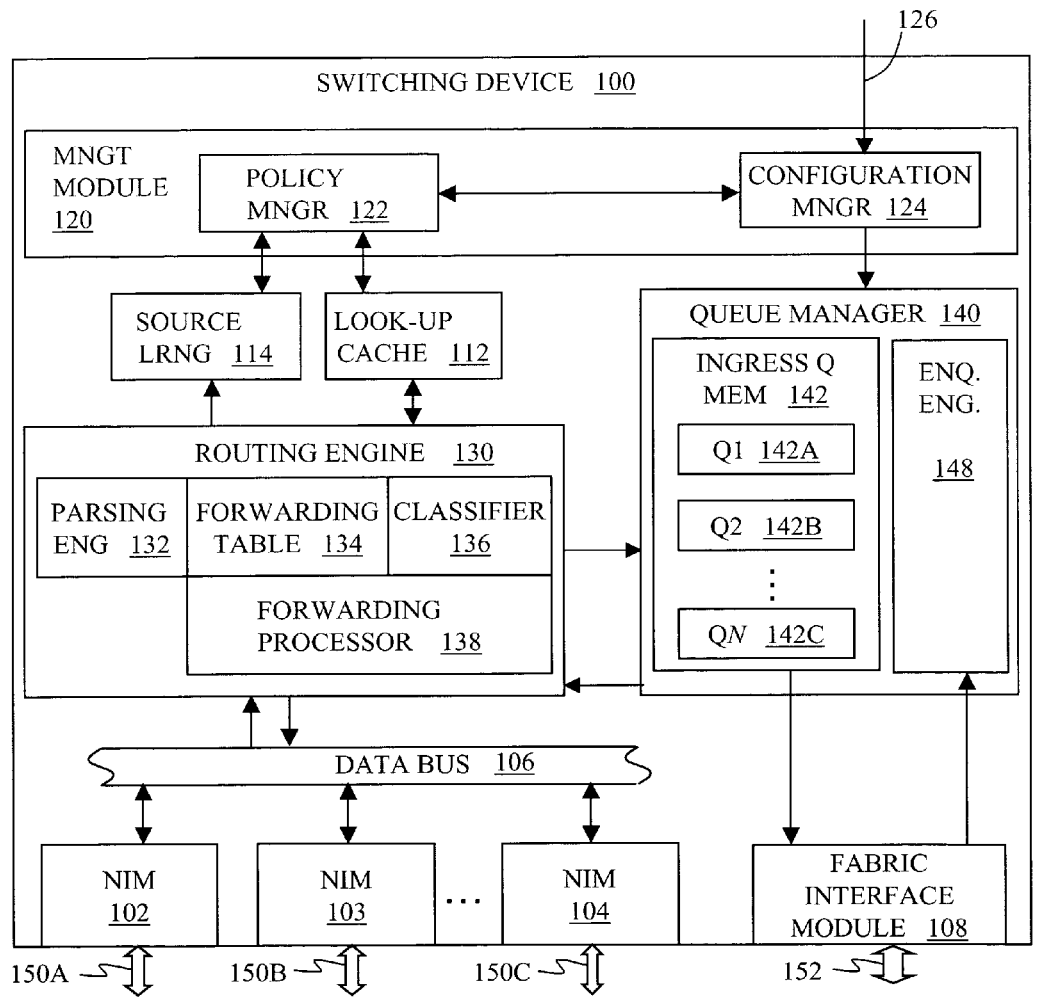
FIG. 1 is a functional block diagram of a switching device for performing classification of QoS flows, according to the preferred embodiment of the present invention.

Illustrated in FIG. 1 is a functional block diagram of a switching device for performing multivariant, common basis classification on packet flows. The switching device 100 is one of a plurality nodes and other addressable entities operatively coupled to a communications network such as the Internet, a local area network (LAN), a wide area network (WAN), a metropolitan area network (MAN), or a combination thereof, for example. The switching device 100 of the preferred embodiment is an Internet Protocol (IP)-enabled device using Ethernet as the link layer, although various other network layer protocols—including Connectionless Network Protocol (CLNP) or Internetwork Packet eXchange (IPX)/Sequenced Packet Exchange (SPX) and link layer protocols—including token ring and asynchronous transfer mode (ATM) WAN/serial protocols such as T1/E1—may be implemented.

The switching device 100 of the preferred embodiment comprises a plurality of network interface modules (NIMs) 102-104, one or more routing engines 130, a queue manager 140, and a management module 120. Each of the NIMs 102-104 is operatively coupled to one or more external ports for purposes of receiving/transmitting ingress/egress data traffic. The NIMs 102-104 preferably include one or more physical interfaces and media access control (MAC) interfaces adapted to exchange packets on an Ethernet communications link (not shown). The interfaces may be physically organized in one or more slots or switch modules that are detachably attached to a common back plane with switch fabric (not shown). The duplex traffic flows 150A-150C, comprising ingress/egress packets or protocol data units (PDUs), are then conveyed between the routing engine 130 and the plurality of NIMs 102-104 by means of one or more internal data buses 106.

The management module 120 generally comprises a policy manager 122 for retaining and implementing traffic policies uploaded to a configuration manager 124 using simple network management protocol (SNMP) messages 126 generated by a network administrator. The policies generated by the policy manager 122 are also based in part on source learning 114 that correlates incoming packets with the NIM on which it is received.

In the preferred embodiment, the policy rules preferably comprise: (a) routing information; (b) quality of service (QoS) rules; and (c) class of service (CoS) rules. One or more local copies of the policy rules are preferably retained in high speed look-up cache 112 where they are available in real-time to the routing engine 130 operating at wire speeds.

The routing engine 130 of the preferred embodiment is an IEEE 802.3-enabled switch generally capable of, but not limited to, performing layer 2 switching operations and layer 3 routing operations using layer 2 through layer 7 information, as defined in the Open Systems Interconnect (OSI) network reference model. The routing engine 130 preferably comprises a parsing engine 132, a forwarding table 134, a multi-dimensional classifier 136, and forwarding processor 138. The parsing engine 132 decapsulates the incoming PDUs of the ingress data stream, extracts one or more bits from IP header, and outputs the IP destination address and preferably a plurality of PDU bit fields used to identify packets and/or distinguish traffic flows.

The IP destination address is then used as a key into the forwarding table 134, preferably stored in a content addressable memory (CAM) or random access memory (RAM) device, containing routing information. In the preferred embodiment, the network identifier formed from the destination IP address of the ingress packet is compared against the known IP addresses in the forwarding table 134. Associated with each of the known IP address is the MAC address of the corresponding device and the interface through which the device is reachable. When one or more matches are detected in the forwarding table 134, the associated MAC address of an adjacent device to which the packet is to be forwarded, also known as the destination swap entry, and the applicable output interface are retrieved and conveyed to the forwarding processor 138. The forwarding processor 138 then places the destination swap entry in the destination MAC field of the outgoing packet that is subsequently passed to the queue manager 140. In the preferred embodiment, the routing engine 130 further includes a multi-dimensional classifier 136 for provisioning various actions necessary to implement QoS and or CoS. The classifier 134 determines which, if any, QoS and/or CoS to apply depending on the value of the PDU bit fields extracted by the parsing engine 132. In the preferred embodiment, the QoS and CoS rules preferably comprise: (a) access control rules that dictate whether a packet is conveyed to the next hop or is dropped in the switching device 100, (b) resource allocation including bandwidth reserved for traffic flows, (c) accounting and billing rules applied to virtual private network (VPN) customers for example, and or (d) priority rules that govern the preferential treatment with which the traffic is serviced by the queue manager 140. One or more local copies of the QoS and CoS rules are preferably retained in high speed look-up cache 112 where they are available in real-time to the routing engine 130 operating at wire speeds.

One skilled in the art will appreciate that the routing engine 130 is one of a multiplicity of processing resources with which the present invention may be practiced. Alternative processing resources may include traffic classifiers, rate policers, accounting devices, editing devices, and address look-up devices, for example.

After the destination address and egress interface are identified, the allowed PDUs are transmitted to the ingress queue memory 142 where they are enqueued in accordance with the priority determined by the classifier 136. A PDU is generally enqueued in one of a plurality of queues 142A-142C preconfigured to offer different classes of service depending on the level of priority allotted. The PDUs are subsequently conveyed to a switch fabric (not shown) via the fabric interface module 108. In some alternative embodiments, the switching device is a stand-alone apparatus with an internal switch fabric that switches the egress PDUs to the egress ports 150A-50C by means of the data bus 106, for example.

Figure 2:
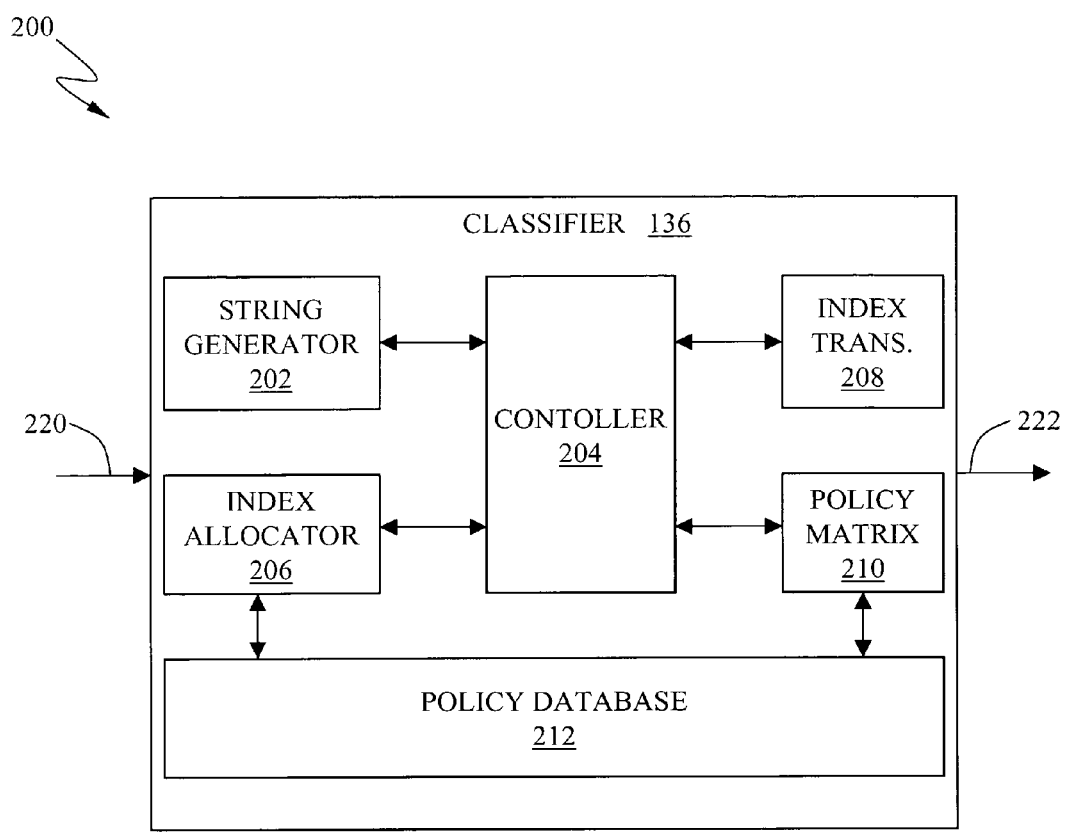
FIG. 2 is a functional block diagram of the classifier of the switching device, according to the preferred embodiment of the present invention.

Illustrated in FIG. 2 is a functional block diagram of the multi-dimensional, common basis classifier 136, according to the preferred embodiment. The classifier 136 comprises a string generator 202, a controller 204, an index allocator 206, an index translator 208, a rule matrix 210, and policy database 212. These various elements cooperate to form a plurality of strings comprising one or more bits of a PDU, map each of the strings into an index used as a key into the rule matrix 210, and retrieve one or more QoS rules derived from the policy database 212. The policies, embodied in the form of QoS rules retained in the policy database 212, define a plurality of flow aggregations and prescribe some processing to be applied to those aggregations. Each QoS rule has two parts: a constraint and an associated action. The constraint commonly comprises one or more criteria against which one or more PDU fields or properties are compared. The criteria may comprise one or more network identifiers, each network identifier including a routing prefix and zero or more trailing bits that are treated as wildcards. An aggregation of 256 Ipv4 addresses ranging from 103.23.3.0 through 103.23.3.255, for example, may be represented by the prefix 103.23.3.0/24, where 24 specifies the length of the prefix and the last 8 bits are wildcards. The associated action may prescribe that any packet satisfying this constraint, for example, be allowed to pass to the next hop or dropped in the switching device.

As described in more detail below, the rule matrix 210 in some embodiments is an N-dimensional array into which QoS rules are retained as a function of a plurality of indices.

Figure 3:
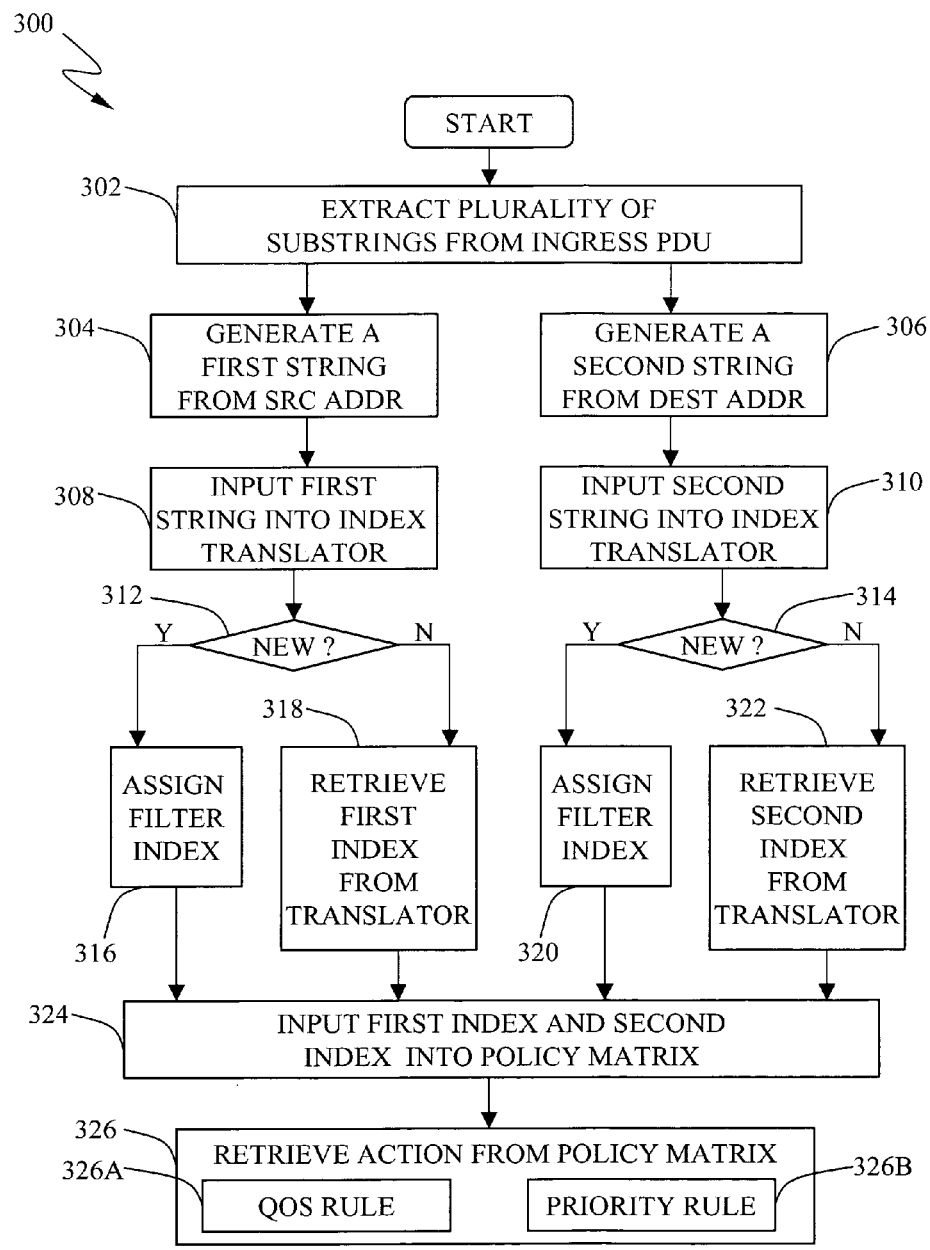
FIG. 3 is a flow chart of the method of classifying QoS flows, according to the preferred embodiment of the present invention.

Illustrated in FIG. 3 is the method by which the switching device 100 classifies a packet from in accordance with a plurality of policies, according to the preferred embodiment. In the parsing step 302, the string generator 202 extracts a plurality of substrings, i.e. one or more bits, from an ingress PDU. In the preferred embodiment, the bits are concatenated to form one or more strings. The PDU bit fields used to generate the strings are chosen so that each PDU belonging to a particular flow is identified as a member of that flow and is distinguished from all other flows visible to the switching device 100. The bit fields extracted from the PDU generally including, but are not limited to, the source address, destination address, ingress and egress switch slot numbers, ingress and egress port numbers, IP protocol, and transport layer protocols including transmission control protocol (TCP) and user datagram protocol (UDP).

The string generator 202 assembles the substrings into a plurality of strings that are used to classify the PDU into one of a plurality of flow aggregations. In the preferred embodiment, two strings are generated for each packet for purposes of conducting a two-dimensional search over the index space. A first string is generated 304 from one or more source address bits, while a second string is generated 306 from one or more destination address bits. In alternative embodiments, three or more strings may be generated for purposes of extending the search to three or more dimensions. Additional strings may be formed from PDU fields or properties generally including, but not limited to, the source address, destination address, ingress and egress switch slot numbers, ingress and egress port numbers, IP protocol, and transport layer protocols including transmission control protocol (TCP) and user datagram protocol (UDP). The plurality of strings are regenerated/generated for each packet.

Figures 4, 5, 6:
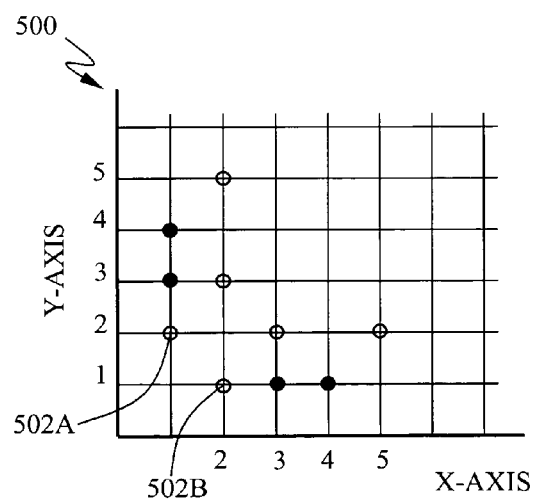
FIG. 4 is an index translator table in the classifiers according to the preferred embodiment of the present invention.
FIG. 5 is a graphical representation of a policy matrix in the classifier, according to the preferred embodiment of the present invention.
FIG. 6 is an action item table associating an action for each of the plurality of indices, according to the preferred embodiment of the present invention.

The first string and second string are then individually provided as inputs to the index translator 208 (steps 308 and 310). The index translator 208 includes an index table 400, illustrated in FIG. 4, that relates each of N search criteria, i.e., possible string values, in the left column 402 with a unique string index in right column 404. The set of criteria represent the complete range of traffic flows explicitly defined by the rules set forth in the policy database 212. The string index, in turn, provides a unique identifier for purposes of searching the policy matrix 500, as described in detail below, and selecting the applicable QoS rule. The index is preferably an integer value between zero and two (2) to the power of (J–1) where J is the number of bits allotted. The index in the preferred embodiment is a five-bit value, giving rise to a total 32 possible indices. If the first string was previously programmed into index translator 208 and is currently present in the index table 400, the new index testing step 312 is answered in the negative and a first index returned (step 312). In general, the criteria against which the string is compared and the corresponding index are generated when the policies are setup in the system. If the first string is not present in the index table 400 of the index translator 208, an index allocator 206 in some embodiments assigns a previously unused index (step 316) to the new string and updates the index translator 208. In other embodiments, a default index is assigned. The process by which a second index is generated (step 306), inputted (step 310), and subsequently retrieved (step 322) or assigned (step 320) is analogous to that of the first index described above. In the preferred embodiment, the index for the first string and second string are derived from the same index table 400. The index space of index table 400 therefore serves as a common basis for a plurality of strings.

The first and second indices returned from the index translator 208 are then provided as input 324 to the policy matrix 210. The policy matrix 210 in the preferred embodiment includes a multi-dimensional memory device, preferably a CAM, capable of being programmed to match pairs of indices, i.e., to associate each of the plurality of indices with one or more other index. One representative device suitable as a policy matrix is Media Switch IXE2424 10/100+Gigabit L2/3/4 Advanced Device manufactured by Intel Corporation of Santa Clara, Calif. By relating each index with one or more other indices, the classifier 136 can define and search for the applicable action associated with the two indices.

The action associated with each pair of indices is retained in the policy matrix 210 is and retrieved (step 324) using two indices. In particular, one or more memory cells in the CAM store an action or a key to an action to be applied to flow when the indices are matched. For example, a first index I1 and a second index I2, which are represented as index set {I1, I2}, point to the intersection value 502A in the graphical representation 500 of the policy matrix 210 illustrated in FIG. 5. The action associated with an intersection may be a QoS rule 326A, CoS rule 326B, or a combination thereof. The intersection value 502A retrieved from the policy matrix 210 is a "pass" indicator ("○") symbolically representing the action to be applied to the flow characterized by string A and string B used as keys into the index table 400 of FIG. 4. Other "pass" indicators are located at intersections {I2, I3}, {I3, I2}, {I2, I5}, and {I5, I2} while "drop" indicators ("●") are located at intersections {I1, I3}, {I3, I1}, {I1, I4}, and {I4, I1}.

In the preferred embodiment employing the Media Switch IXE2424, the index order is commutative. That is, the intersection value stored at the intersection value {I1, I2} 502A equals the intersection value {I2, I1} 502B. One skilled in the art will appreciate that the applicable policy corresponding to the intersection value {I1, I2} can be retrieved irrespective of the order in which the indices are inputted to the policy matrix 210. If the strings are generated from the source and destination addresses, for example, the classification is independent of the direction of the flow between the endpoints between which the flow is exchanged. QoS/CoS rules may therefore be defined with respect to individual nodes, irrespective of whether a node is the source or destination of the flow.

In some other embodiments, classification of a packet is selected by arbitrating between a plurality of rules, particularly QoS rules, derived from the plurality of individual strings using hierarchical rules. As illustrated in the index-action table 600 of FIG. 6, an action 604 may be prescribed for each individual index 602. If the plurality of strings map into a plurality of actions that are consistent with one another, each of the one or more actions may be applied to the packet. If the plurality of actions conflict, hierarchical rules may be employed to select the most appropriate action with the greatest precedence. Consider, for example, a flow characterized by two indices, the first string being associated with a "pass" action and the second string associated with a "drop" action. An hierarchical rule dictating that "drop" actions takes precedence over "pass" actions would cause such a flow to be filtered. If only one of the plurality of strings maps into an existing, pre-defined index, the action associated with that rule may be applied.

One of the many advantages of the embodiment described immediately above is that it permits even new, previously undetected flows to be classified. When the classifier 136 observes a new flow that yields a plurality of strings that are already defined in the in the index table 400, the classifier 136 merely selects between the plurality of associated actions. Consider, for example, a first flow between endpoints U and V that gives rise to a first index I1 and second index I2 and is defined in the policy matrix with the action "pass" action, thereby allowing the flow to be forwarded to the next hop. Consider also a second flow between endpoints X and Y that gives rise to a first index I3 and second index I4 and is defined in the policy matrix with the action "drop" action, thereby causing the flow to be terminated in the switching device 100. If at a later time, the switching device 100 observes a new flow between endpoints U and X, for example, the classifier 136 can "infer" that the exchange with endpoint X should be dropped even though the rule for that flow had not prescribed in the policy database 212. If, on the other hand, both indices of the new flow were associated with a "pass" action, the new flow may be allowed.

Other more complex schema can also be implemented to select between competing and otherwise inconsistent policies. An arbiter present in classifier 136 in some embodiments may be consulted when a new flow characterized by one or more existing, i.e. pre-defined, strings is detected but less than all strings are matched. The switching device 100 can therefore adapt dynamically to and classify previously unknown flow. In this manner, the switching device 100 can support allowable flows that might otherwise be dropped.

Initialization of Policy Matrix

Figure 7:
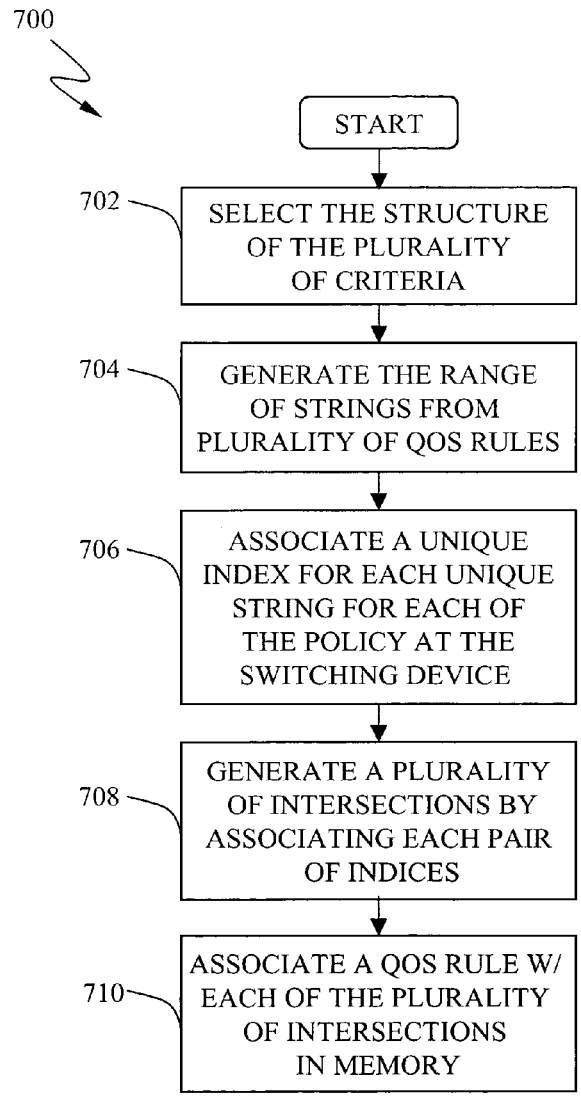
FIG. 7 is a flow chart of the method of constructing one or more tables for purposes of classifying QoS flows, according to the preferred embodiment of the present invention.

Prior to inputting PDUs into the classifier for purposes of classification, the index translator 208 and policy matrix 210 must be initialized in order to implement the rule set in the policy database 212. Illustrated in FIG. 7 is the method by which the index translator 208 and the policy matrix 210 are preprogrammed with the appropriate strings, indices, and policies, according to the preferred embodiment.

First, the structure or form of one or more criteria used to classify the flows associated policies are defined (step 702). The criteria 402 comprise one or more bits selected from, but not limited to, one or more of the following PDU fields and or properties: source address, destination address, switch slot number, port number, protocol, and transport layer protocols including transmission control protocol (TCP) and user datagram protocol (UDP). A strings in the preferred embodiment is a concatenation of various fields present in the incoming PDU and assumes the form:

Protocol.IP_Port.Slot_Port.IP_Address, where Protocol represents the protocol type (8 bits) defined in the protocol filed of the IP header, the IP_Port represents the OSI layer 4 port node number on which the ingress PDU is received (16 bits), the Slot_Port represents the slot of the switching device 100 on which the ingress PDU is received (16 bits), and the IP_Address represents the value of the source IP address or the destination IP address of the ingress PDU (32 bits).

In the string generating step 704, the range of unique strings is determined from the plurality of QoS rules retained in the policy database 212. The protocol, port number, slot number, and either the source or destination IP address specified by each rule is concatenated in the manner described above. The set of unique strings then represents the range of strings needed to select a rule from the policy database 212 for each flow aggregations visible to the switching device 100.

A unique index is allocated (step 706) or otherwise associated with each unique string formed in the string generating step 704. A PDU is then assigned the index when the string generated from the PDU matches the string generated from the policy, i.e. criteria. The indices may be consecutively ordered numbers beginning with zero, although one skilled in the art will recognize that this is not strictly necessary. In the preferred embodiment, the index field is a five bit number giving rise to 32 indices (or 64 for filtering rules) to support 32 policies. In the preferred embodiment, one index is set aside as a default index, thereby limiting the N indices to support (N−1) rules.

The strings and indices are preferably associated in the index translator table 400 that relates each unique string in column 402 with one of the N indices in column 404. In some alternative embodiments, the index translator 208 is in the form of a Practical Algorithm to Retrieve Information Coded as Alphanumeric ("Patricia") trie that provides a compact and searchable representation of the binary or alphanumeric data from which the strings are composed. A Patricia trie (derived from "reTRIEval"), well known to those skilled in the art, is a form tree or data structure that includes a plurality of nodes and leafs interconnected by branches determined by the data stored therein. The nodes retain elements of PDU fields from which the strings are composes while the leafs include the strings and their associated index into the policy matrix.

One skilled in the art will appreciate that any of various types of storage media may serve as an index translator including, but not limited to non-volatile memory such as read-only memory (ROM), programmable ROM (PROM), random access memory (RAM), SRAM, and DRAM; and searchable memory devices such as content addressable memory (CAM) and ternary CAM (TCAM).

Once the indices are assigned (step 706), the policy matrix 500 is initialized by relating each of the strings associated with each QoS rule to the action to be applied to corresponding traffic. In the intersection generating step 708, an intersection point or set of points, is defined for each policy in the policy database 212. An intersection point is the point in N-dimensional index space to which the plurality of indices of a rule map. The N-axes are identical and range from the lowest number index to the highest number index. In the preferred embodiment, there are two or more indices for each rule that map to an intersection point represented into the policy matrix 210 graphically illustrated by the two-dimensional index space 500 of FIG. 5. As described above, an index set {I1, I2} comprising a first index 1 and second index 2, for example, defines the intersection point 502A illustrated in the index space 500.

In IXE2424 chip implemented in the preferred embodiment, the index set provided as input to the policy matrix in the operation state are commutative such that {I1, I2}={I2, I1}. The QoS rule retrieved from the policy matrix therefore yields the same result independent of the order in which they are provided as input. In some alternative embodiments, the order may not be commutative in which case a second independent intersection point 502B is defined for the index set {I1, I2}.

Once one or more intersection points are defined, the action for the QoS rule is then assigned to the intersection points. The assignment is made by uploading the action or a pointer to such an action to the memory cell of the IXE2424 chip associated with the two indices.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A method of classifying a protocol data unit (PDU) comprising the steps of:
    (a) generating with a string generator a first string and a second string with which to characterize the PDU;
    (b) determining a first index associated with the first string and a second index associated with the second string, wherein the first index and second index are selected from a plurality of indices; and
    (c) selecting an action from a plurality of actions based on the first index and the second index, each action being associated with two or more indices of the plurality of indices.

2. The method of claim 1, wherein PDU has one or more fields and the first string and second string each comprise one or more bits derived from the one or more fields of the PDU.

3. The method of claim 2, wherein the one or more fields are selected from a group consisting of: ingress switch slot number, egress switch slot number, ingress port number, egress port number, network layer protocol, and transport layer protocol.

4. The method of claim 2, wherein the first string comprises one or more bits selected from a destination address field of the PDU.

5. The method of claim 4, wherein the second string comprises one or more bits selected from a source address field of the PDU.

6. The method of claim 1, wherein the method further includes the step of generating the plurality of actions from policies that characterize a plurality of traffic flows.

7. The method of claim 1, wherein the selecting step further comprises the step of using the indices as keys into a memory device comprising the plurality of actions.

8. The method of claim 7, wherein the actions further comprise instructions passing the PDU to a PDU destination address and instructions to filter the PDU.

9. The method of claim 7, wherein the actions further comprise one or more pointers to one or more instructions defining the manner in which to process the PDU.

10. The method of claim 1, wherein the PDU has one or more fields and the step of determining a first index and the second index further comprises the step of searching a tree, wherein one or more fields of the PDU are compared against the nodes of the tree.

11. The method of claim 10, wherein the tree is a Patricia trie.

12. An apparatus for classifying a protocol data unit (PDU), the apparatus comprising:
   (a) a string generator for generating a first string and a second string with which to characterize the PDU;
   (b) an index allocator for retrieving a first index associated with the first string and a second index associated with the second string, wherein the first index and second index are selected from a plurality of indices; and
   (c) a memory device, operatively coupled to the index allocator, comprising a plurality of actions, each being selected based on two or more indices from the plurality of indices.

13. The apparatus of claim 12, wherein the first string and second string each comprise one or more bits derived from one or more fields of the PDU.

14. The apparatus of claim 13, wherein the one or more fields are selected from the group consisting of: a source address, an ingress and an egress switch slot numbers, an ingress and an egress port numbers, an IP protocol, and a transport layer protocols including transmission control protocol (TCP) and user datagram protocol (UDP).

15. The apparatus of claim 14, wherein the first string comprises one or more bits selected from a destination address field of the PDU.

16. The apparatus of claim 15, wherein the second string comprises one or more bits selected from a source address field of the PDU.

17. The apparatus of claim 12, wherein the plurality of actions are derived from policies that characterize a plurality of traffic flows.

18. The apparatus of claim 12, wherein the plurality of indices are keys into the memory device.

19. The apparatus of claim 18, wherein the actions further comprise instructions for passing the PDU to a PDU destination address and instructions to filter the PDU.

20. The apparatus of claim 18, wherein the actions further comprise one or more pointers to one or more instructions defining the manner in which to process the PDU.

21. The apparatus of claim 12, wherein the index allocator comprises a trie, the trie comprising nodes against which one or more fields of the PDU are compared.

22. A method of classifying a protocol data unit (PDU) comprising the steps of:
   (a) generating with a string generator a first string from source information associated with the PDU;
   (b) generating with the string generator a second string from destination information associated with the PDU;
   (c) identifying a first QoS action from a plurality of QoS actions based on the first string;
   (d) identifying a second QoS action from a plurality of QoS actions based the second string; and
   (e) determining a final QoS action from at least one of the first and second QoS actions.

23. The method of claim 22, wherein the step of determining a final QoS action comprises applying a hierarchical rule indicating which one of the first and second QoS actions has precedence.

24. The method of claim 22, wherein one of the first and second QoS actions is a PDU pass action recommending that the PDU be forwarded, and one of the QoS actions is a PDU drop action recommending that the PDU be filtered.

25. The method of claim 22, wherein the hierarchical rule indicates that the PDU drop action has precedence over the PDU pass action.

* * * * *